W. H. BURGESS.
Baling-Press.
No. 199,509. Patented Jan. 22, 1878.
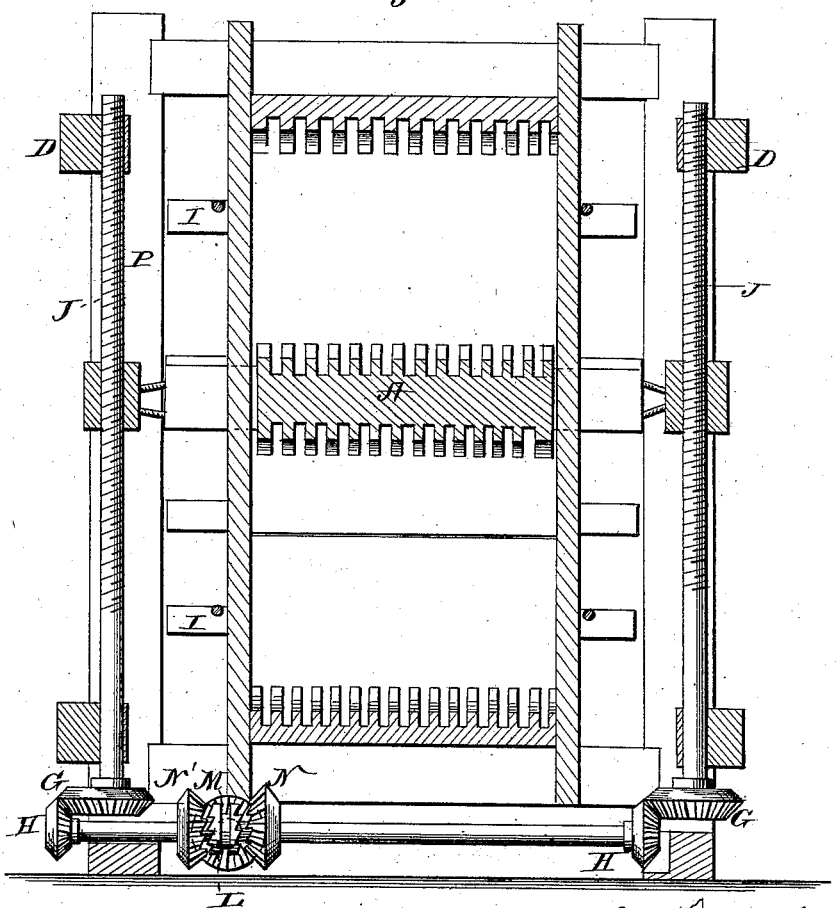
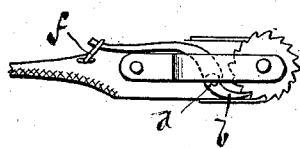
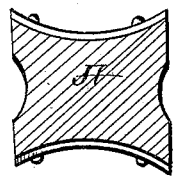
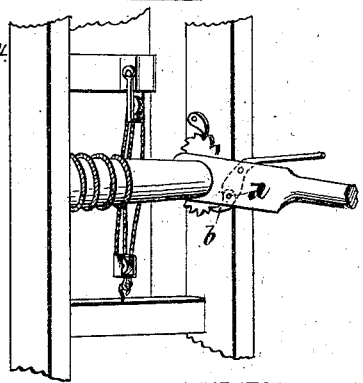
WITNESSES
INVENTOR
ATTORNEYS

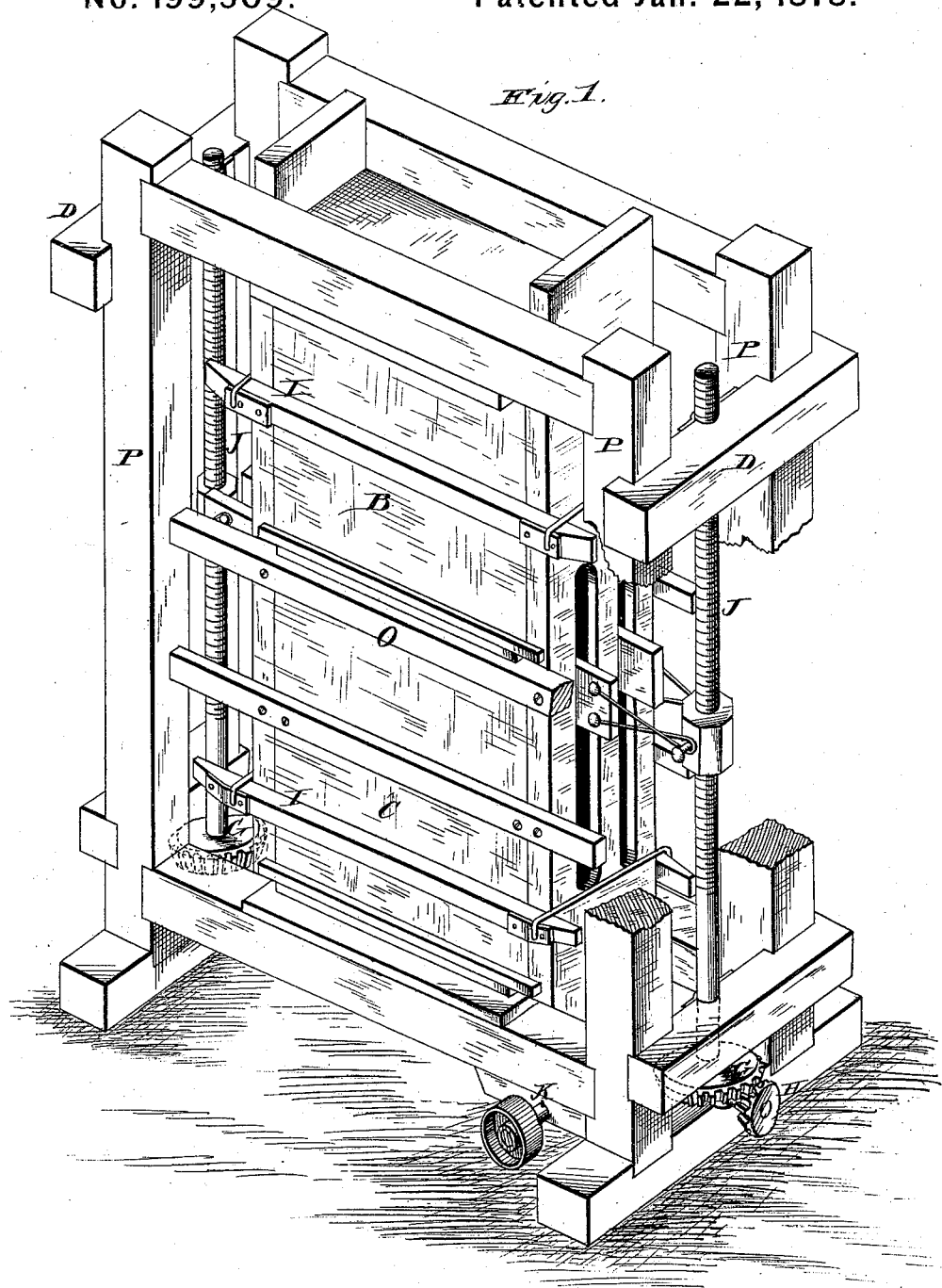

UNITED STATES PATENT OFFICE.

WILLIAM H. BURGESS, OF JACKSON P. O., NORTH CAROLINA.

IMPROVEMENT IN BALING-PRESSES.

Specification forming part of Letters Patent No. 199,509, dated January 22, 1878; application filed November 26, 1877.

*To all whom it may concern:*

Be it known that I, WILLIAM H. BURGESS, of Jackson P. O., in the county of Northampton, and in the State of North Carolina, have invented certain new and useful Improvements in Baling-Presses; and do hereby declare that the following is a full, clear, and exact description thereof, reference being had to the accompanying drawings, and to the letters of reference marked thereon, making a part of this specification.

This invention relates to machines for baling and rebaling loose materials, and to machines for compressing such bales in a more convenient form for transportation, and to the manner and means of operation.

With the ordinary presses and compresses it is necessary to press the baling material—such as cotton, wool, hay, &c.—much closer than it can be confined by the usual method of tying or banding. If it is desirable to press a bale so that it will occupy a space of thirty inches in the pressing-box, in order to accomplish which, suppose a pressure of twenty-five thousand pounds be required, it is evident that the follower must be forced several inches below that point, requiring a vast increase of power to gain each successive inch required, in order to allow the bale to be tied in the usual manner, so that when the pressure is removed and the bale having expanded, as they invariably do, it shall not occupy a greater space than that to which it was supposed to have been reduced by twenty-five thousand pounds' pressure.

But it is found that the bale at the time it was tied was actually subjected to a pressure of one hundred thousand pounds or more, and that all this excess of force has been lost by the method pursued, the bale when removed from the press indicating only the moderate pressure first named, while in the usual process of compressing bales the great loss of power, so apparent in the former instance, is many times greater. Supposing that under a pressure of about one million pounds a bale of cotton may be reduced to about twelve inches in thickness, this, when banded in the usual manner, and released from the pressure, immediately assumes the volume it had at the point when subjected to a pressure of less than half the amount actually exerted.

It is the nature of all loose materials when baled to assume a different shape from that given the bales in the usual presses, partly on account of the greater bulk of material at the points where the expansion occurs, and partly on account of the greater readiness with which the common tie yields to that pressure or bulging at those particular points, the presses being made with a view to forming bales in a cubical shape having square edges and flat surfaces; but on being released from the press the sides of the bale to which the pressure was applied immediately assume an oval or rounded surface.

To remedy the expansion or bulging of the bale, and to direct the pressure and tendency of the material toward the center of its bulk, thus relieving the usually great outward pressure and strain, I have constructed a follower and pressing-beds with concavely-curved pressing-faces, curved or hollowed for the purpose of pressing the bale in its natural and proper shape in the first instance, and, furthermore, to allow the ties or bands to be adjusted in their places in a close snug manner, which cannot be done over the square edges of bales formed by straight pressing-faces.

In tramping and packing loose material, particularly cotton, it is found to be much more effective to tramp it close around the edges, and so, on the same principle, should the operation be continued, with greater pressure on the outer edges than on the general surface, to the close; and hence it is that, by pressing with curved concave surfaces, the outward strain of the material on the sides of the pressing-box and frame of the press is almost entirely relieved.

If a convex follower be brought to bear upon material placed on a like convex pressing-bed, which is often the case, it is obvious that the pressure and outward tendency of the material will be enormous; but if the pressing-surfaces be straight and working squarely together, the strain is not so great, which is the case with new presses; but when the pressing-faces have become worn, and, in a degree, convexly rounded, the outward tendency of the baling material is often, and even usually, so great that it screeches and grates against the planks of the pressing-box with such force that shreds and fibers of the wood are torn off and carried along with the material.

In pressing with the concave faces the operation is entirely noiseless, without excessive friction, the inside of the box becoming smooth and polished, for from the peculiar shape of the pressing-faces the force is directed from the outer edges of the bale, thus forming a snug close package in an easy manner.

In the annexed drawings, Figure 1 is a perspective view of my improved press. Fig. 2 is a longitudinal vertical section of the same. Figs. 3, 4, and 5 are detailed views of parts thereof.

A represents a double follower, having concavely-formed pressing-surfaces. This follower is operated by screws J, situated at each end, and driven by suitable bevel-gearing G H in the bottom frame-work of the press. K is the shaft to which the power is applied, provided with bevel-wheel M, geared into wheels N and N', which are loose upon their axle, producing a motion of said wheels N N' in opposite directions. Between these wheels is placed a clutch, L, loosely keyed on the same axle, and capable of being moved by a lever to engage with either wheel, producing a right or left hand motion of the axle and gearing attached thereto, at the will of the operator; or by disengagement with both the axle will remain at rest.

The screws J are provided with solid bearings at the top, bolted to the timbers D, which prevent the screws from oscillating and swaying when in motion, causing the machine to run more smoothly and giving it greater strength.

By this arrangement the follower A is driven on the screws J to press bales upward and downward with the same advantage and force, gravity excepted, with the same gearing in the same box, producing a continuous operation of filling, pressing, and banding in the same press at the same time. By this means double the amount of work may be accomplished that is possible to be done with the machines now in common use, and in a much more perfect manner.

For the purpose of producing a continuous operation, as above described, the baling-box is provided with two sets of doors, B and C, held in position by bars I, or in any convenient manner, and a platform made around the press for the operator's convenience, about the height of the timber O. The follower is raised to its extreme height, leaving a sufficient space above the timber O to admit the material which is placed in the bottom part of the box. The follower is then forced downward by the screws J, by the gearing already described, as far as desirable, when the motion is stopped by disengaging the clutch. The doors C are then removed, and the bale, being in its natural shape, with oval sides formed by the concave follower and bed, may be snugly and closely tied; and while the first bale is being tied material for a second bale is placed in the upper part of the press, directly on top of the upper pressing-face of the follower; then the motion is reversed, forcing the follower upward as far as necessary, and sufficiently above the timber O to admit the material for a third bale, which is put in while the second bale is being tied, and the motion is again reversed, pressing the third bale, and so on continuously for any number; or the same result will be produced if the follower be taken for the pressing-beds and made stationary at the center of the box, and the gearing described be placed between the two pressing-faces of these beds, which were before the follower-faces, and the former beds at the top and bottom be taken as followers, and the screws J be attached in a stationary manner to the ends of these followers, and the nuts or taps be placed on the wheels G and revolved thereby; and as it would be necessary to gear the pinions H into the inside segments of each of the wheels G, thereby producing a motion of the two wheels G in relatively opposite directions, it would follow that one of the screws J should have a left-hand and the other a right-hand thread.

Supposing the upper part of the box be filled with material, and the gearing be set in motion in a right-hand direction, the material would be pressed by the upper follower, while the lower one would descend, making room for material in the bottom part of the press to be reversed at the will of the operator.

The follower, with double platens or two pressing-faces, either curved, concave, or metal-rimmed, or with level grooved faces, or concavely ribbed, or concavely plain, is equally adapted to any and all presses, however operated, to produce the same result, the primary object of this invention being to direct the pressure toward the center of the subject material, and to present it to the operator in the natural shape of a bale, in order to be banded more closely than is usual, and at the same time with greater ease. Therefore the pressing-faces may be made grooved or plain, ribbed or metal-rimmed, which metal rim would be very effective on wooden faces, any of which devices would answer the purpose if constructed concavely hollowing or obtusely V-shaped, according to the true principles of this invention.

To adapt the windlass-press, such as described in my Patent No. 149,988, to the continuous baling operation, the windlasses should be placed between the posts P at each end of the press, about six feet from the ground or bed of the press, allowing the follower to pass the windlasses on the inside in moving upward and downward, which windlasses are operated by levers, and the pulley-blocks changed from top to bottom, and vice versa, according to the movement of the follower.

In the arrangement of this kind of press it becomes necessary to have a more convenient apparatus for releasing the rope from the windlasses, yet leaving all the parts securely in position for resuming the operation on subsequent bales. This is effected, as shown in Fig. 5, by a hinged joint, *d*, in the pawl *b*, with a link, *f*, to hold it securely in position while pressing. When the operation is complete, and it is necessary to release the windlass, the link *f* is thrown backward from the pawl *b*, and the pawl at once disengages itself from the ratchet-wheel.

I do not claim a horizontal baling-press in which a grooved follower placed in the center of the same is caused to travel at will to either end of the box; nor do I broadly claim a follower having a single actuating pressing-face with concave surface and grooves.

Having thus fully described my invention, what I claim as new, and desire to secure by Letters Patent, is—

1. In a baling-press, the combination of a follower having concave upper and lower surfaces with an upper and a lower pressing-bed having concave faces, said follower being movable upward and downward toward the pressing-beds, substantially as set forth.

2. The jointed pawl *b d* and link *f*, in combination with the operating-lever, as described.

In testimony that I claim the foregoing I have hereunto set my hand and seal this 20th day of October, 1877.

WILLIAM HARVEY BURGESS. [L. S.]

Witnesses:
 JOHN DOAN,
 E. A. DOAN.